April 18, 1939.   R. E. DE KAY   2,154,809
MOTION PICTURE APPARATUS
Filed July 13, 1936   4 Sheets-Sheet 1

Inventor:
ROBERT E. DE KAY
BY
ATTORNEY

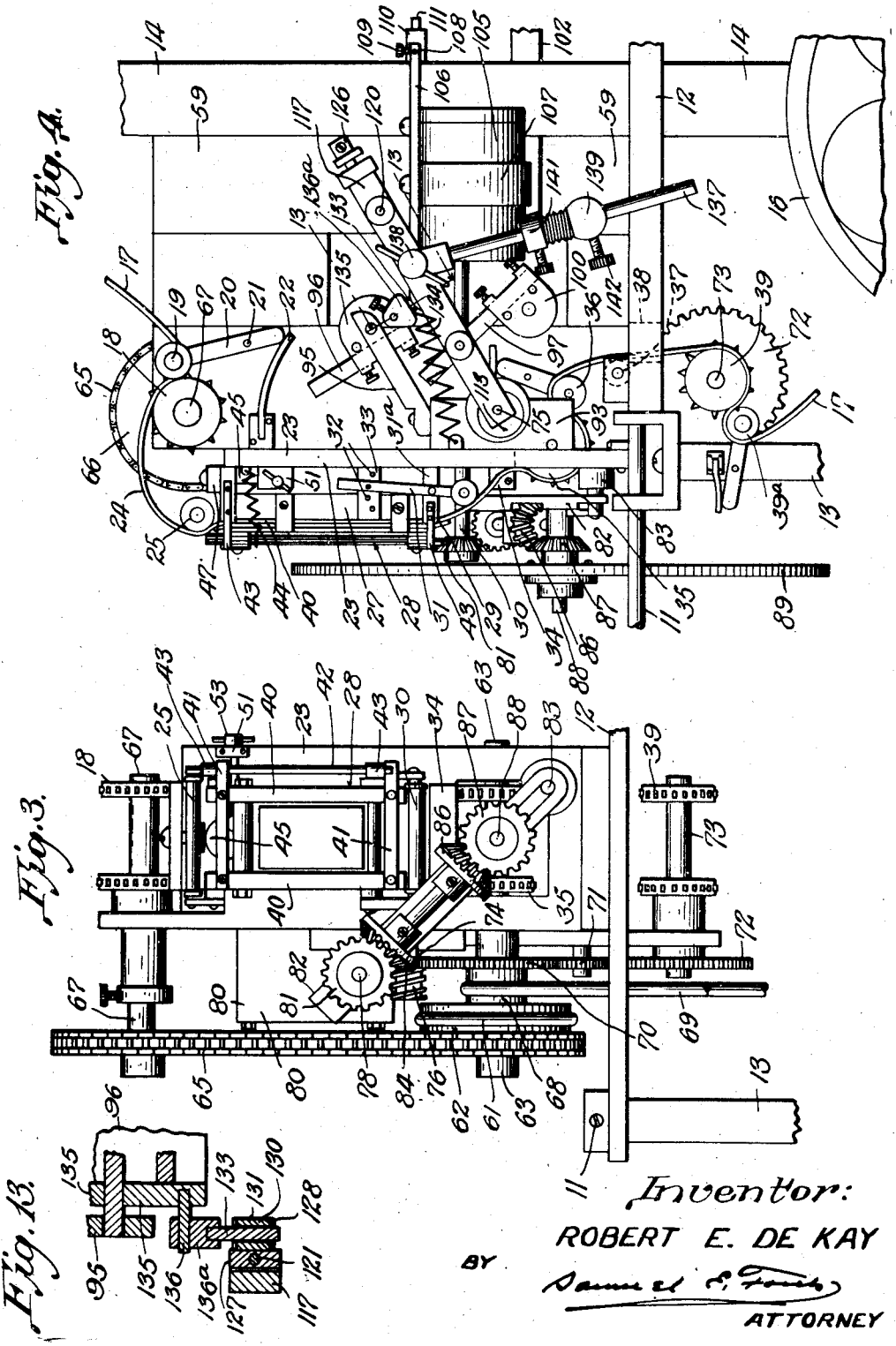

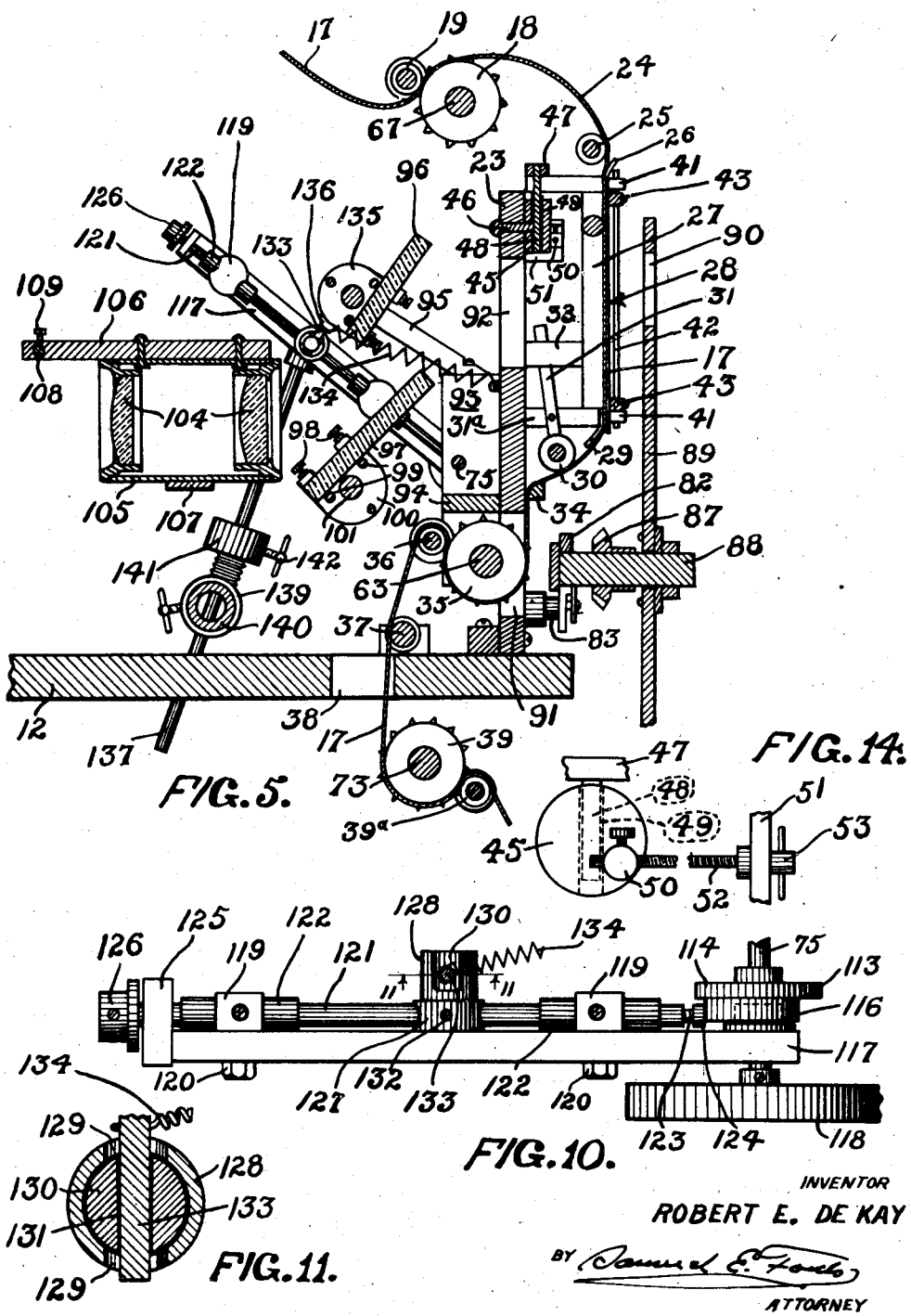

April 18, 1939.  R. E. DE KAY  2,154,809
MOTION PICTURE APPARATUS
Filed July 13, 1936   4 Sheets-Sheet 4
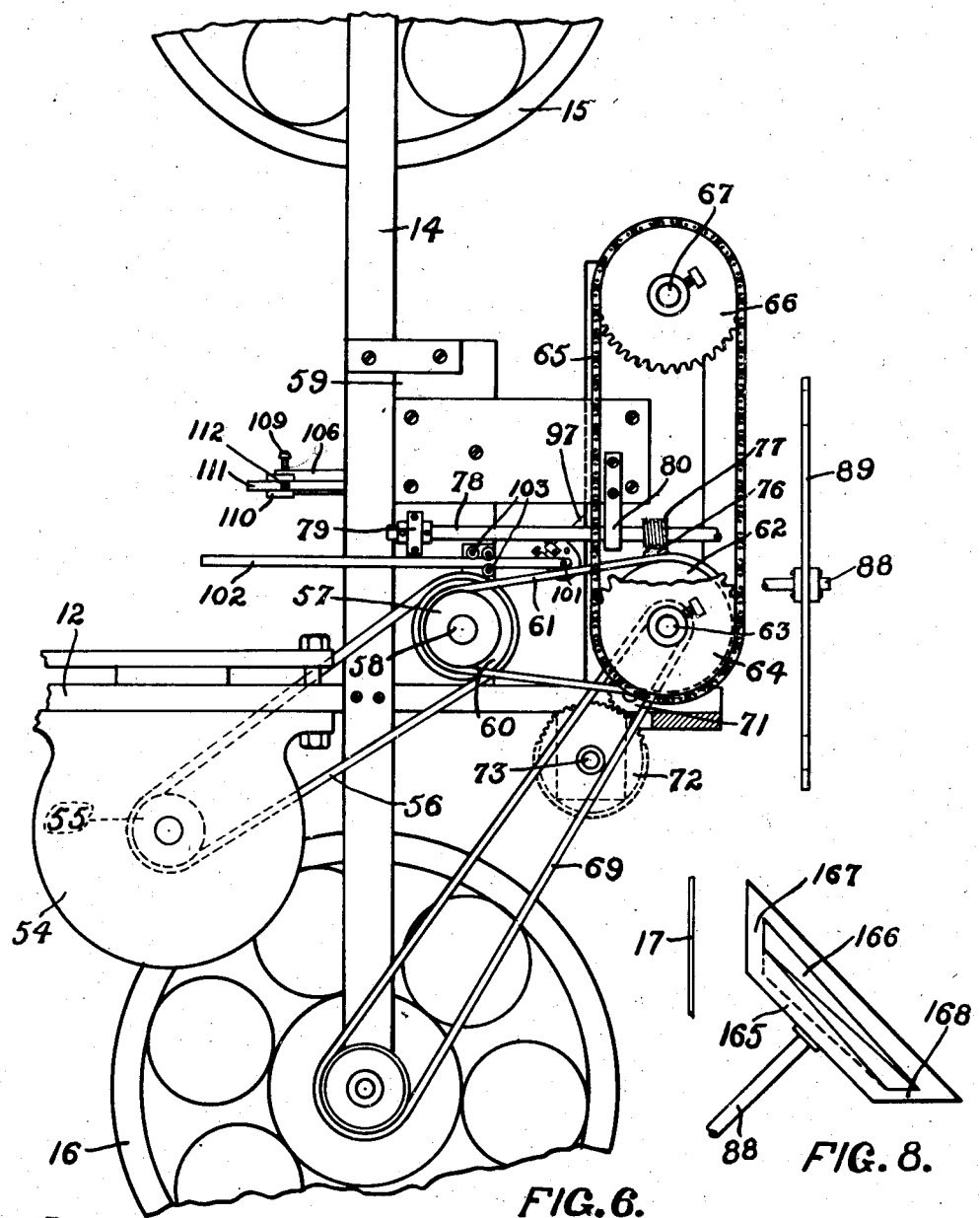
FIG. 6.
FIG. 8.
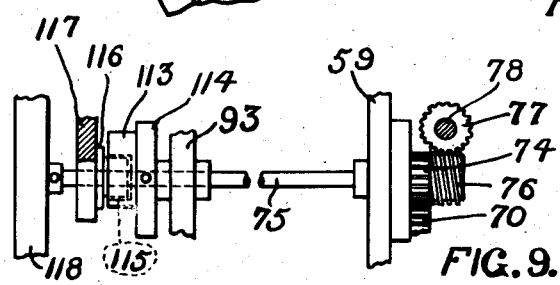
FIG. 9.
INVENTOR
ROBERT E. DE KAY
BY
ATTORNEY Patented Apr. 18, 1939

2,154,809

UNITED STATES PATENT OFFICE 2,154,809

MOTION PICTURE APPARATUS

Robert E. De Kay, Los Angeles, Calif.

Application July 13, 1936, Serial No. 90,365

4 Claims. (Cl. 88—16.8)

This invention relates to motion picture projectors and cameras of that type in which the film does not move intermittently but passes between the source of light and the aperture plate at a constant and uniform speed. It makes possible the use of film either with or without sprocket holes and, which is even more important, it makes practicable for the first time the use of such thin and fragile materials as Cellophane in place of the usual celluoid films. The advantages, such as cheapness, cleanness, remarkable transparency and non-inflammability of Cellophane over celluloid, are well known to those familiar with the art; but its use has hitherto been impracticable because such thin material cannot stand the wear, tear and jerking of the intermittent machines.

Many other advantages of a projector or camera giving a steady and uniform movement to the film may be suggested. First, such a machine may, by using direct gearing and a positive motion cam, be made substantially noiseless. Second, it allows the picture and the sound track to be taken side by side; which makes it possible to repair breaks at any point of the film without damage to the synchronization of picture and sound. Third, this type of projector may be manufactured more cheaply than intermittent machines, and will retain its efficiency for much longer periods. Fourth, it may be run at any desired speed without damage to the film,—a feature of great significance in color photography and projection. Fifth, use of such a machine greatly reduces the fire hazard, since the film is always in motion and is under less strain; the tendency to break thus being much less. And there are other advantages of somewhat less importance; so it will readily be seen that a practicable uniform picture apparatus is a much-needed advice.

It is the chief object of this invention to provide a machine embodying in practicable form the above enumerated advantages.

Attempts have been made to provide the art with such a machine but, to the best of my knowledge, none has been a practicable success. This was due either to an incomplete understanding of the function of the oscillating mirror, or, more probably, to inadequate means for providing such oscillation. The mirror, of course, must move at a speed necessary to keep the angles of incidence and of reflection always equal, in order to provide the necessary light ray correction. But the prior devices have the mirror arm acting directly from the actuating cam with a swing motion, thus giving to the mirror not a true uniform motion, but a harmonic one, which destroys its usefulness by projecting unsteady, fuzzy pictures.

It is another object of the invention to provide an apparatus for giving the proper motion to the oscillating mirror so that clear pictures will obtain.

In a continuous motion picture projector or camera the aperture through which the film is exposed must be larger than that in the ordinary machine and therefore some provision must be made for cutting out all light rays except those desired. It is a further object of the invention to provide improved means for cutting out the undesired rays.

With these and other objects in mind, to appear as the description proceeds, reference is had to the accompanying drawings in which:

Fig. 3 is a view similar to Fig. 2, but on a larger scale and with an obscuring member omitted;

Fig. 4 is a view similar to Fig. 1, but on a larger scale and showing only the essential mechanism;

Fig. 5 is a sectional view, on a larger scale, taken on line 5—5 of Fig. 2;

Fig. 6 is an elevation, on a larger scale, of the side opposite that shown in Fig. 1, its chief purpose being to illustrate the driving mechanism, details in the background being omitted for purposes of clarity;

Fig. 7 is an elevation, on a somewhat smaller scale, of the shutter;

Fig. 8 is a side elevation of a modification of the shutter of Fig. 7;

Fig. 9 is an enlarged view of a detail of the drive mechanism;

Fig. 10 is an enlarged view of the apparatus for oscillating the mirror;

Fig. 11 is a sectional view, somewhat enlarged, taken on line 11—11 of Fig. 10;

Fig. 13 is a sectional view, on a larger scale, taken on line 13—13 of Fig. 4, and Fig. 14 is an enlarged view of the apparatus used for adjusting the aperture plate.

In brief recapitulation, the invention comprises a continuous motion projector or camera, an oscillating mirror for correcting the light rays, means for giving the proper oscillation to the mirror, an improved shutter for blocking out undesired rays, and driving means for these elements.

Figure 1:
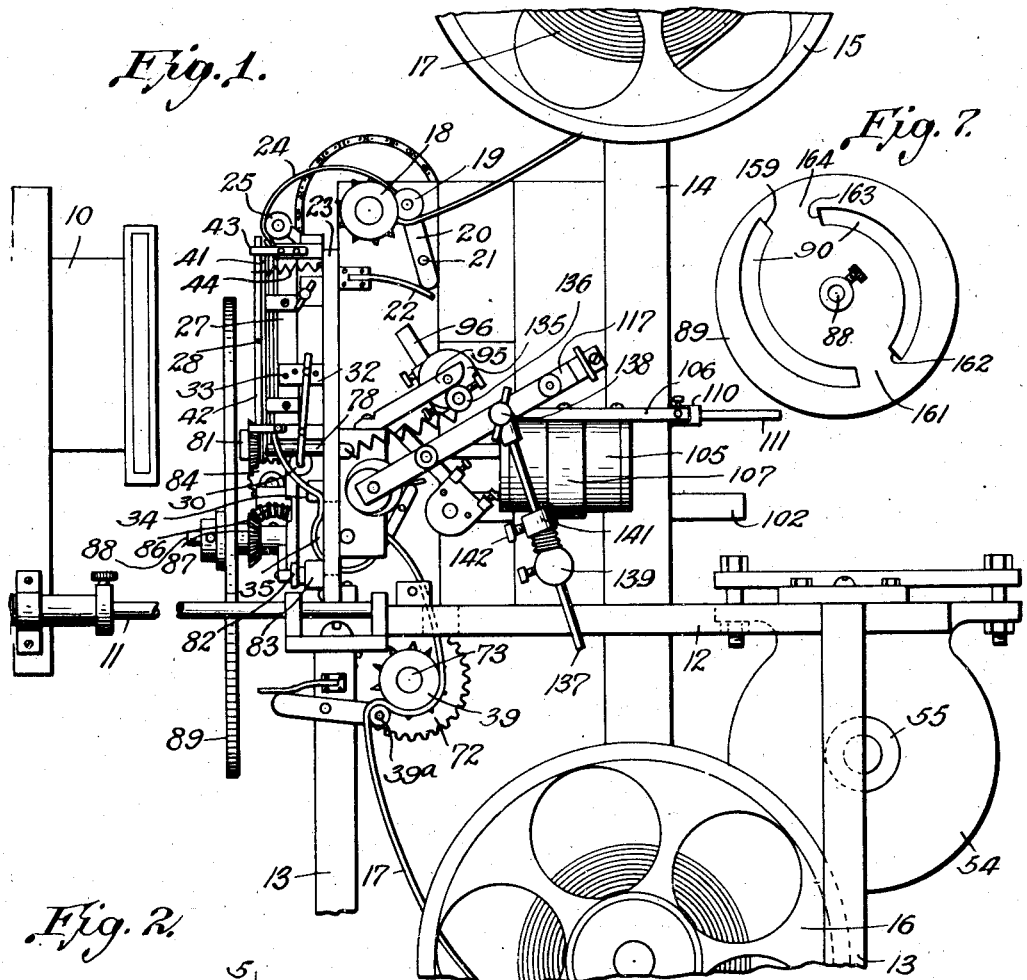
Fig. 1 is a side elevation of a motion picture projector equipped with the invention, some of the more immaterial parts being broken away.

Referring more particularly to the drawings, 10 is a suitable source of light which may be mounted on rods 11 for adjustment relative to the motion picture projector. A plate or table 12, bearing the projector, is supported by legs 13, and to the plate 12 is rigidly secured an arm 14 at the upper and lower ends of which are respectively secured a rotatable delivering reel 15, and a rotatable receiving reel 16. The film 17 passes from reel 15, through the projector, and is wound upon reel 16. The course of the film is shown in Figs. 1, 4 and 5, particularly in Fig. 5, to which reference is now made. From reel 15 the film first passes over a driven sprocket 18, to which it is held tightly by a roller 19. Roller 19 (Fig. 4) is carried by an arm 20, which is pivoted at 21 and is pressed against the film and sprocket 18 by a spring member 22, operating on the arm. Rigidly secured to table 12 is an upright plate 23 to which the aperture plate and its associated mechanism (to be described) is attached. From sprocket 18 the film extends in a loose curve indicated at 24 to and over a roller 25 pivoted to a support which is rigidly attached to plate 23. The film is curved, as at 24, to provide a slack, thus to prevent any drag or jerking which might injure it. From roller 25 the film is guided by curved elements 26 between the aperture plate 27 and a swinging holder 28, to be described later and best shown in Fig. 3. Other elements 29, carried by the holder 28, curve oppositely to the elements 26 and guide the film to a tension roller 30, which is journaled to an arm 31; said arm 31 being pivoted to an extension 31a of the aperture plate 27 and being adjusted by a set screw operating in spaced depressions 32 in an extension 33 of the said plate. A bar 34 having a curved inner surface guides the film downwardly to a second driven sprocket 35, against which the film is held by a spring-pressed roller 36. After the film has passed about and over the roller 36 it passes to a fixed roller 37 and is bent thereby to pass through a slot 38 in the table 12, and so to a third driven sprocket 39, from whence it extends in a loose curve to reel 16. The film is held to sprocket 39 by a spring-pressed roller 39a.

The swinging holder 28 is in the shape of an open rectangular frame composed of upright bars 40 connected by horizontal bars 41 which extend at one side beyond the holder and are apertured to receive a rod 42. It will be noted that curved elements 26 and 29 are the bent ends of bars 40. Brackets 43 project from the holder 28 and are also apertured to receive the rod 42; so it will be seen that the holder 28 is similar to a hinged door with rod 42 serving as the pivot pin. The holder presses the film against the aperture plate, such pressure being exerted by a spring 44 connecting the holder to the upright plate 23.

The aperture plate 27 is removable, and is also adjustable both vertically and horizontally, by means of mechanism best seen in Figs. 5 and 14. These features are desirable because the removal of the plate allows for easy cleaning and repairing, and because the adjustment permits exact alignment of the aperture with the mirror. A disc 45 is removably secured, as by a threaded bolt 46, to plate 23. The aperture plate 27 and, consequently, holder 28, are supported by a transverse bar 47, to which is rigidly secured a pin 48 which is inserted downwardly in a bore 49 of disc 45. Bolt 46 impinges upon pin 48, as seen in Fig. 5 and it will be noted that by loosening bolt 46 the aperture plate may be raised or lowered as pin 48 slides in bore 49, and can be held in the desired position when the bolt is again tightened. Pivotally secured to disc 45 is a member 50, which is preferably a short cylinder though the shape of this element is immaterial. A bracket or extension 51, rigidly secured to plate 23, is apertured to receive a screw-threaded rod 52, capped by any suitable means 53 for turning, rod 52 being screwed through a central threaded bore (not shown) in the member 50. As will be seen, any turning of rod 52 will vary the distance between bracket 51 and member 50, which causes a slight turning and shifting of the disc 45 and pin 48, with the result that the aperture plate is tilted in a vertical plane.

Turning now to the driving mechanism, a motor 54 is suitably secured to the table 12. From its pulley 55 a cable or belt 56 connects with a pulley 57 journaled on a shaft 58 which is secured to a plate 59 extending upwardly from table 12. A second pulley 60 is rigidly secured to pulley 57 and, from pulley 60, a cable or belt 61 connects with a pulley 62 on a shaft 63. Turning with shaft 63 is a large pinion 64 adapted to drive a chain 65 which also acts to drive a second large sprocket pinion 66, thus to turn the shaft 67 to which pinion 66 is secured. As will be seen in Fig. 3, shaft 63 drives the sprocket 35, and shaft 67 drives sprocket 18, both sprockets being of equal size and, necessarily turning at the same speed and in the same direction due to the positive drive of chain 65. Upon the shaft 63 is yet another pulley 68 (Fig. 3) from which the reel 16 is driven by a cable or belt 69 (Fig. 6). Also upon the shaft 63 is a large gear 70 intermeshing at its lower face with a small gear 71. Gear 71 in turn intermeshes with another large gear 72 which drives a shaft 73 and thereby the sprocket 39. Gears 70, 71 and 72 have the ratio necessary to drive sprocket 39 at the same speed as sprockets 18 and 35, so it will be seen that upon the actuation of motor 54 the film 17 is simultaneously driven at three different points.

Intermeshing at its upper surface with gear 70 is a small gear 74 (seen best in Fig. 9) which is adapted to rotate a shaft 75, for a purpose presently to be disclosed. Adjacent gear 74 upon shaft 75 is a worm 76 meshing with a second worm 77 upon a shaft 78 extending at right angles with shaft 75 and suitably journaled at points 79 and 80 (Fig. 6). Rotating with shaft 78 is a mitre gear 81 (Fig. 3). The shaft 78 passes through the upper part of a bar 82, the lower end of which is removably secured to a stub shaft 83 extending from plate 23. A second mitre gear 84 meshes with gear 81, and is secured to a shaft 85 suitably journaled upon the bar 82. A third mitre gear 86, upon shaft 85, meshes with a fourth mitre gear 87, which drives a shaft 88. It will be observed that the four mitre gears transfer the rotation of shaft 78 to shaft 88 and their ratio is such that the shafts rotate at the same speed. Further, when the bar 82 is disconnected from the stub-shaft 83, it can be swung about shaft 78 and, in so doing, it will carry the shaft 85 and the mitre gears 84 and 86 with it.

Rotating with the shaft 88 is a shutter 89 having an opening in the shape of a broken spiral 90, the purpose of which will be discussed later in another connection.

The upright plate 23 has two horizontal slotlike openings. The lower of these, 91 permits passage of the film and allows room for the rotation of sprocket 35, as seen in Fig. 5. The upper opening, shown at 92, permits passage of light from the aperture of the aperture plate to the reflecting apparatus. Secured to plate 23 is a bracket 93 having a transverse strengthening member 94 which is approximately at the upper edge of opening 91. Rigidly secured at the upper edge of bracket 93 is an arm 95 which extends upwardly at an angle and supports the oscillating mirror 96.

Below mirror 96 and approximately parallel thereto is a second mirror 97 rigidly held in place by set screws 98 which press the mirror against transverse rods 99 secured in end members 100. It will be understood that, by changes simple to those skilled in the art, the mirror 97 may be made the oscillating mirror, and mirror 96 the rigid reflecting mirror. The holding device for the mirror 97 is itself held in place by a rod 101 which is rigidly attached to a bar 102. As will be seen in Fig. 6, bar 102 is held between small rotatable spools or rollers 103 on the member 59; the bar therefore being longitudinally adjustable by pushing or pulling it between and behind the said rollers. This permits fore and aft adjustment of the reflecting mirror 97 with respect to the oscillating mirror 96 and the lenses 104, which are held in a cylindrical container 105 secured to a bar 106 and further supported by an encircling band 107. A rod 108 extends through the end of bar 106 and is removably and adjustably held therein by a set screw 109. Rod 108 is preferably integral with a short block 110 which has a bore at right angles to the rod 108, the bore being adapted to contain loosely a pin 111 and to slide upon such pin. The pin is set solidly in upright 14. A second set screw 112 holds the block 110 in the desired position. It will be observed that, like the reflecting mirror, the lenses are also adjustable longitudinally.

Referring again to Fig. 9, and to Fig. 10, shaft 75, receiving its actuation through gears 70 and 74, is journaled in plate 59 and bracket 93, and beyond bracket 93 it carries a cam 113 which is rigidly secured to, or is integral with, a strengthening disc 114. Cam 113 is recessed at 115 to provide a bearing surface for a circular extension 116 of a supporting member or arm 117, to be described. Shaft 75 extends through extension 116 and arm 117 and is free to turn in the bores therein, and may be terminated with a fly wheel 118. Such a flywheel has a tendency to steady the movement of the cam and, though it is not shown in Figs 1 to 6, it is understood that its use there is contemplated, if desired.

Referring now to Figs. 10 and 11, the arm 117 and its associated mechanism will be described. At suitable distances on arm 117 are bearings 119, secured to the arm as by bolts 120, and having a central bore designated to permit easy longitudinal sliding of a rod 121, the bore being lengthened by the insertion of bushings 122. At one end the rod 121 is provided with a screw-threaded pin 123 having a head 124 adapted to ride upon the cam 113. At its other end, beyond an additional strengthening bearing 125, the rod 121 carries a removable cap 126 to limit its movement. Slidably mounted upon rod 121, between bearings 119, is a disc 127 upon which, and preferably integral therewith, is a hollow cylinder 128 having two broad slots 129 extending from its upper end almost to the disc 127. Set within the hollow cylinder 128, in such manner that it may rotate freely, is a short cylinder 130 having a bore 131 at right angles to its longer axis. Disc 127 may be held in proper place upon the rod 121 by means of a set screw 132. Fitting loosely within the bore 131 is a pin 133, which pin makes the connection with the oscillating mirror, as best seen in Fig. 13. A spring 134 connects pin 133 with any suitable attachment on upright plate 23, as shown in Figs. 4 and 5, and, as will later be discussed in more detail, provides the necessary tension to keep the head 124 of pin 123 pressing constantly against cam 113.

Referring particularly to Fig. 4, the oscillating mirror 96 is held between end members 135 (similar to members 100 of the reflecting mirror). Rigidly secured to end member 135 through a pin 136 is a small disc-shaped element 136ª having a bore within which pin 133 is immovably held. Arm 117 is, of course, supported at its lower end by its bearing on shaft 75; but since the pin 133 fits loosely in cylinder 130, an additional support is necessary. A rod 137 is held to the arm 117 through a block member having a tightening member 138 adapted to fit screw-threads in the arm. A second block member or disc 139 is removably secured to a rod or pipe 140 (Fig. 5) which is fastened firmly to the back plate 59. Such fastening is not shown, but may be of any suitable kind. A second block member or disc 141 is adjustably secured to disc 139; and both discs have a bore to allow rod 137 to slide when not held by set screw 142. Thus when the pin 133 has been inserted in bore 131 of cylinder 130, the arm 117 is raised until in its proper position, carrying with it rod 137, and then set screw 142 is screwed firmly upon the rod, holding the rod and consequently arm 117 in the position selected.

It has been found that in order to give perfect results the pin 133 must be at right angles to rod 121. That is, the pin and rod will be at right angles at the middle of the rod's endwise movement, though the angle will vary to either side slightly at the extremes of such movement.

The adjusting mechanism represented by rod 137 and discs 139 and 141 is a very necessary feature, since the raising and lowering of rod 137 of course raises and lowers pin 133, and thus alters the leverage of the pin on the mirror 96, which in turn varies the speed and amount of the mirror's oscillation. The adjustment synchronizes the motion of the mirror with the motion of the film. Inasmuch as the film has a tendency to shrink, it will be seen how essential such an adjustment becomes.

The means for oscillating the mirror 96 functions as follows: Driven by shaft 75, the cam 113 turns about the extension 116 on the arm 117 and, through the head 124 of pin 123, moves the rod 121 endwise carrying with it the disc 127. Pin 133, being held rigidly to the mirror structure, is swung by cylinder 130; and cylinder 130, being loosely contained in the hollow cylinder 128, as the pin is rocked, rotates; such rotation being made possible by the slots 129 in the hollow cylinder 130. The pin, then, moves in a slight arc and, since it is immovably connected to the mirror structure, the mirror moves in a similar arc. As the thinner portion of the cam 113 comes into contact with the head 124, the spring 134 pulls pin 133 backwards and so moves the rod 121; both the pin and the mirror reversing the short arc previously covered. It will be remembered that cam 113 is driven positively from the mechanism which drives the film, which assures that the mirror moves with each picture on the film as the latter progresses past the aperture plate.

Figure 12:
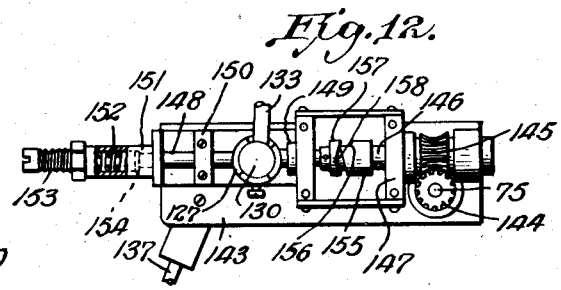
Fig. 12 is a view of a modification of the apparatus shown in Fig. 10.

In Fig. 12 a variation is shown of the mechanism just described for oscillating the mirror. In some particulars this device is the preferred form, though it accomplishes the same results. Where the elements have remained unchanged, the same reference numerals will be used. A plate 143 replaces arm 117, and journaled therein, is the shaft 75. Shaft 75 carries a worm gear 144 which meshes with a second worm gear 145 turning with a hollow shaft 146. A grease box 147 is fastened suitably to plate 143, and within the box two cams are adapted to cooperate. A rod 148 is extended through the hollow shaft 146, is journaled at one end of the grease box, at 149, and in a bracket 150, and ends within a cylinder 151. Cylinder 151 contains a coiled spring 152 and is provided with a screw-threaded device 153 for adjusting the tension of the spring, which is held between device 153 and the flanged end 154 of rod 148. Mounted upon rod 148 is the disc 127 holding cylinder 130 which receives the pin 133, as in the apparatus shown in Fig. 10. Secured to the shaft 146 within box 147 is a cam 155 having a face surface which slopes to an abrupt drop 156. Opposing the cam 155, and secured to rod 148, is a second cam 157 having a surface which slopes to an abrupt drop 158. The spring 152, it will be observed, keeps cam 157 pressed against cam 155. In operation, with the turning of worm 145 the cam 155 turns against cam 157, their sloping surfaces forcing rod 148 back against spring 152 until the drops 156 and 158 coincide, when the pressure of the cams against the spring suddenly ceases and the spring as suddenly snaps rod 148 in the opposite direction until the cams again connect. The movement thus given pin 133, and consequently the oscillating mirror, is substantially the same as that given by the apparatus of Fig. 8; but the change makes possible a more abrupt return of the rod and mirror than could be obtained with use of cam 113.

Figure 2:
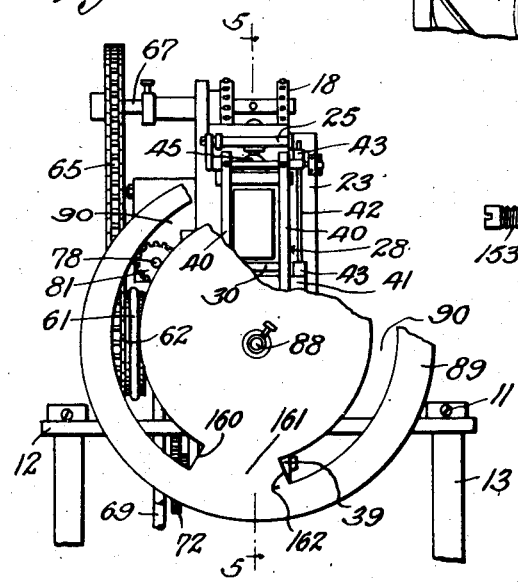
Fig. 2 is an end elevation as seen from the left in Fig. 1; certain parts being broken away.

Another important feature of the invention is the shutter, shown at 89 in Figs. 2 and 7, and a modification of which is shown in Fig. 8. The necessity for its use may readily be made apparent by a comparison between continuous motion projectors and those operating intermittently. In the intermittent machine, each picture on the film is shown momentarily, then is jerked out of sight to make room for the next picture, and so on. This jerking, parenthetically, is the chief obstacle to the use of cellophane films, which are too delicate for such treatment. In the intermittent machine the aperture is substantially the size of the individual picture on the film, but in a continuous machine the aperture must be much longer to permit the picture to be followed down, and this, but for the means now to be described, would allow undesirable light rays to pass the aperture plate. Any device for cutting out these extra rays must, of course, travel uniformly down with the film and return instantly for the next exposure. To obtain this result I have provided a circular rotatable shutter and have placed it between the light source and the film. This location is important since it not only prevents undesirable light rays from reaching the film, but also cuts down considerably the amount of heat from the light source which otherwise would fall constantly on the film and mechanism.

The shutter shown in Figs. 2 and 7 is a circular sheet of any suitable material (cardboard and other fibrous material being quite satisfactory) through which a spiral slot 90 has been cut. The pitch of the slot is the length of a single picture on the film. If it be assumed that the shutter of Fig. 7 is turning in a clockwise direction, the picture will first appear (for example) at point 159 and will be exposed until the shutter has turned far enough to bring point 159 to where a point 160 is indicated.

At this point begins a flicker blade 161, interrupting the slot. At point 162 the slot is continued and the light again shines through the shutter, the picture showing until the point 163 is reached, when the light is cut off by an interruption 164. As will be seen in Fig. 7, the slot has traveled down with the picture a distance equal to the length of the picture. Then the next picture on the film is seen at point 159. There will, during the revolution of the shutter, be two interruptions when the light is cut off momentarily. Interruption 164 is to allow the slot to coincide with the next picture as it first begins to pass the aperture. The flicker blade 161 has two purposes. First, it serves to strengthen the shutter by forming a second connection between its center portion and the rim beyond the slot. Second, it serves, in a manner, to rest the eye. Were the picture to be illuminated continuously from point 159 to point 163 of the slot, the shift to the second picture would be noticeable and objectionable, but when this is balanced by a second flicker (passage of interruption 161 across the aperture), neither blind spot is noticeable.

There are two objections to shutter 89, though neither is serious. On small projectors where space is limited, and on cameras, a large flat shutter cannot be used. But a flat shutter must be large so that the curve of the spiral will not be so small that it will show appreciably in the picture. To avoid these difficulties I have designed the shutter shown in Fig. 8. This shutter is in the form of a truncated cone 165, the slot 166 being cut in the sides, and having an interruption 167 and a flicker blade 168. It will be understood that by this construction the same results are obtained as would be were the cone a cylinder with the light source in its center—that is, there will be no curved edge thrown on the film, but a straight line, slightly at an angle to the horizon. This shutter can be made quite small in comparison with shutter 89.

The operation of the machine as a whole will need but brief comment, since the elements not described in detail are an old story to those familiar with the art. Those features which form a part of the invention comprise the shutter, the positive drives simultaneouly moving the film, the means for oscillating the mirror, these means also having a positive drive synchronized with the film drives, and others to be brought out in the appended claims.

It is to be understood that many changes may be made in the detailed apparatus shown for purposes of illustration, and that these changes are to be construed as being within the purviews of the invention. There are obviously many possible variations in the means shown which might accomplish the results equally well.

Having thus described my invention, I claim:
1. In a motion picture machine having a con- tinuously moving film, means for producing a stationary image from the moving film image, such means comprising a mirror adapted for oscillation, and means for oscillating the mirror, such latter means comprising a rod adapted for endwise movement, an arcuate surfaced bearing member attached to the rod, a pin attached to the mirror and adapted to be actuated, an arcuate journal in the bearing member connected with the pin, a cam for moving the rod, and means for driving the cam.

2. Apparatus as described in claim 1 including means to mount the reciprocating rod at substantially right angles to the pin.

3. In a motion picture machine having a continuously moving film, an aperture plate containing an aperture, means for adjusting the aperture plate vertically, and means for adjusting the aperture plate horizontally, in combination with means for producing a stationary image from the moving film image, such means comprising a mirror adapted for oscillation and means for oscillating the mirror, such latter means comprising a rod adapted for endwise movement, an arcuate surfaced bearing member attached to the rod, a pin attached to the mirror and adapted to be actuated, an arcuate journal in the bearing member connected with the pin, a cam for moving the rod, and means for driving the cam.

4. Apparatus as described in claim 3, in combination with means for adjusting the position of the rod with respect to the mirror, for the purpose described, and means to mount the reciprocating rod at substantially right angles to the pin.

ROBERT E. DE KAY.